United States Patent
Grytzelius et al.

(10) Patent No.: US 10,138,955 B2
(45) Date of Patent: Nov. 27, 2018

(54) DEPRESSIBLE PINS CLUTCH PACK ASSEMBLY WITH SEPARATOR SPRING

(71) Applicant: FORD GLOBAL TECHNOLOGIES, LLC, Dearborn, MI (US)

(72) Inventors: Bryant David Grytzelius, Canton, MI (US); Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/228,072

(22) Filed: Aug. 4, 2016

(65) Prior Publication Data
US 2018/0038427 A1 Feb. 8, 2018

(51) Int. Cl.
F16D 47/04 (2006.01)
F16D 13/52 (2006.01)
F16D 21/00 (2006.01)
F16D 19/00 (2006.01)

(52) U.S. Cl.
CPC ............ F16D 47/04 (2013.01); F16D 13/52 (2013.01); F16D 19/00 (2013.01); F16D 21/00 (2013.01)

(58) Field of Classification Search
CPC ... F16D 1/0805; F16D 2013/706; F16D 13/52
See application file for complete search history.

(56) References Cited

U.S. PATENT DOCUMENTS

| | | | | |
|---|---|---|---|---|
| 2,036,005 A | * | 3/1936 | Wemp | F16D 13/385 192/110 R |
| 2,764,261 A | * | 9/1956 | Bridges | F16D 55/40 188/73.38 |
| 2,861,225 A | * | 11/1958 | Mergen | F16D 27/08 192/35 |
| 3,618,408 A | * | 11/1971 | Koseff | F16H 25/20 192/94 |
| 4,479,569 A | * | 10/1984 | Kummer | F16D 13/385 188/71.5 |
| 4,534,457 A | * | 8/1985 | Eltze | B60T 1/06 188/71.5 |
| 4,640,399 A | * | 2/1987 | Borjesson | F16D 13/385 188/71.7 |
| 4,892,432 A | | 1/1990 | Cooper | |
| 5,653,322 A | | 8/1997 | Vasa et al. | |
| 5,715,918 A | | 2/1998 | Everett et al. | |
| 5,878,857 A | * | 3/1999 | Fukuda | F16D 13/52 192/109 A |
| 8,978,857 B2 | * | 3/2015 | Wilson | F16D 13/385 192/70.17 |

(Continued)

FOREIGN PATENT DOCUMENTS

DE 10154668 A1 * 5/2003 ............. F16D 13/52
DE 102012110648 5/2014

Primary Examiner — Stacey A Fluhart
(74) Attorney, Agent, or Firm — James Dottavio; Brooks Kushman P.C.

(57) ABSTRACT

A clutch for an automatic transmission includes a tubular housing surrounding a clutch pack and having an end for engaging with a pressure plate. An annular separator spring on the end provides a biasing force against the pressure plate. A plurality of depressible pins are disposed in the housing and are located radially outward from the annular spring for inhibiting radial movement of the separator spring.

17 Claims, 3 Drawing Sheets

(56) References Cited

U.S. PATENT DOCUMENTS

2011/0024254 A1\* 2/2011 Cookerly ............... B64D 35/00
                                                192/70.252
2014/0102846 A1\* 4/2014 Raber ................... F16D 13/646
                                                192/70.11

\* cited by examiner

DEPRESSIBLE PINS CLUTCH PACK ASSEMBLY WITH SEPARATOR SPRING

TECHNICAL FIELD

This disclosure relates to a clutch assembly having pins for inhibiting radial movement of a separator spring.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

In a rear wheel drive vehicle, the engine and transmission are commonly mounted along a longitudinal axis of the vehicle, perpendicular to the axis about which the wheels rotate. Power from a transmission output shaft is conveyed by a driveshaft to a differential assembly which changes the axis of rotation, multiplies the torque by a final drive ratio, and permits the wheels to rotate at slightly different speeds. In a front wheel drive vehicle, the engine and transmission are commonly mounted transversely, such that the engine crankshaft rotates about an axis parallel to the axis about which the wheels rotate. In a front wheel drive vehicle, it is common to combine the transmission and the differential into a single unit called a transaxle.

Several vehicle design trends combine to limit the space available for a transaxle. A desire to limit the frontal area to reduce drag and improve styling tends to reduce the engine compartment width. Switching from engines with the cylinders arranged in a V pattern to engines with the cylinders inline increases the length of the engine. At the same time, the number of distinct transmission ratios has been tending to increase, increasing the number of parts required in the transmission. Consequently, transaxles must be designed with some components radially within other components in order to minimize the total axial length.

Some clutches in particular transmissions may have separator springs. The separator springs bias the clutch pack such that the free height of the clutch pack attempts to exceed the housing that holds the clutch pack, biasing the clutch pack against the housing.

SUMMARY

In one embodiment, a clutch for an automatic transmission includes a tubular housing surrounding a clutch pack and having an end for engaging with a pressure plate. An annular separator spring on the end provides a biasing force against the pressure plate. A plurality of depressible pins are disposed in the housing and are located radially outward from the annular spring for inhibiting radial movement of the separator spring.

In another embodiment, a clutch assembly includes a clutch pack stacked along an axis, a housing radially surrounding the clutch pack, and a one-way clutch axially aligned with the housing. The one-way clutch has an end plate engaging the clutch pack. A separator spring is disposed radially inward from the housing, and between the clutch pack and the one-way clutch. A pin is between the housing and the one-way clutch for inhibiting radial movement of the separator spring.

In another embodiment, a method of assembling a clutch assembly for an automotive transmission is provided. The method includes placing an annular separator ring within a housing that contains friction plates and radially inward from a plurality of pins. The method also includes placing an end plate of a one-way clutch onto the housing to contain the separator spring between the housing and the end plate while compressing the pins into the housing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

Figure 1:
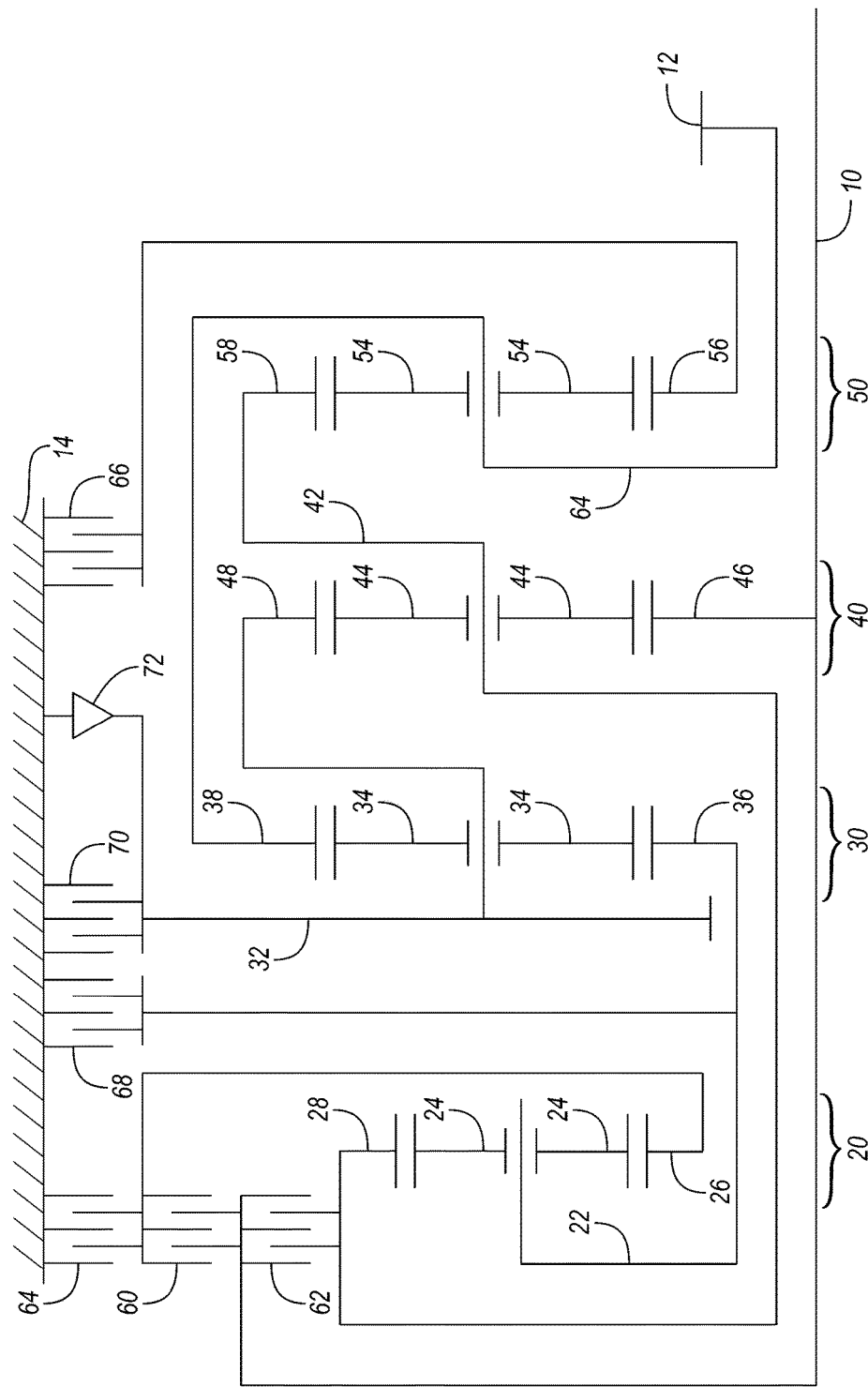
FIG. 1 is a schematic representation of a transmission gearing arrangement, according to one embodiment.

A transmission gearing arrangement is illustrated schematically in FIG. 1. Input shaft 10 is driven by an internal combustion engine, potentially via a launch device such as a torque converter. Output 12 drives the vehicle wheels, potentially via gearing and a differential. The various components of the gearing arrangement are supported within a transmission case 14 that is fixed to vehicle structure. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears 24 mesh with external gear teeth on a sun gear 26 and with internal gear teeth on a ring gear 28. Sun gear 26 and ring gear 28 are supported to rotate about the same axis as the carrier. Gear sets 30, 40, and 50 are similarly structured.

Sun gear 46 is fixedly coupled to input shaft 10. Ring gear 38 and carrier 52 are fixedly coupled to output 12. Carrier 22 is fixedly coupled to sun gear 36. Ring gear 28, carrier 42, and ring gear 58 are mutually fixedly coupled. Carrier 32 is fixedly coupled to ring gear 48. Clutch 62 selectively couples ring gear 28 to input shaft. Sun gear 26 is selectively coupled to input shaft 10 by clutch 60 and selectively held against rotation by brake 64. Brake 66 selectively holds sun gear 56 against rotation. Brake 68 selectively holds carrier 22 and sun gear 36 against rotation. Carrier 32 and ring gear 48 are selectively held against rotation by brake 70 and passively held against rotation in one direction by one way brake 72.

As shown in Table 1, engaging the shift elements in combinations of two establishes eight forward speed ratios and one reverse speed ratio between input shaft 10 and output 12. An X indicates that the shift element is required to establish the speed ratio.

TABLE 1

|  | 60 | 62 | 64 | 66 | 68 | 70/72 | Ratio | Step |
|---|---|---|---|---|---|---|---|---|
| Rev | X |  |  |  |  | X | −3.79 | 89% |
| 1$^{st}$ |  |  |  | X |  | X | 4.26 |  |
| 2$^{nd}$ |  |  |  | X | X |  | 2.73 | 1.56 |
| 3$^{rd}$ |  |  | X | X |  |  | 2.19 | 1.25 |
| 4$^{th}$ | X |  |  | X |  |  | 1.71 | 1.28 |
| 5$^{th}$ |  | X |  | X |  |  | 1.33 | 1.29 |
| 6$^{th}$ | X | X |  |  |  |  | 1.00 | 1.33 |
| 7$^{th}$ |  | X | X |  |  |  | 0.85 | 1.18 |
| 8$^{th}$ |  | X |  |  | X |  | 0.69 | 1.23 |

Figure 4:
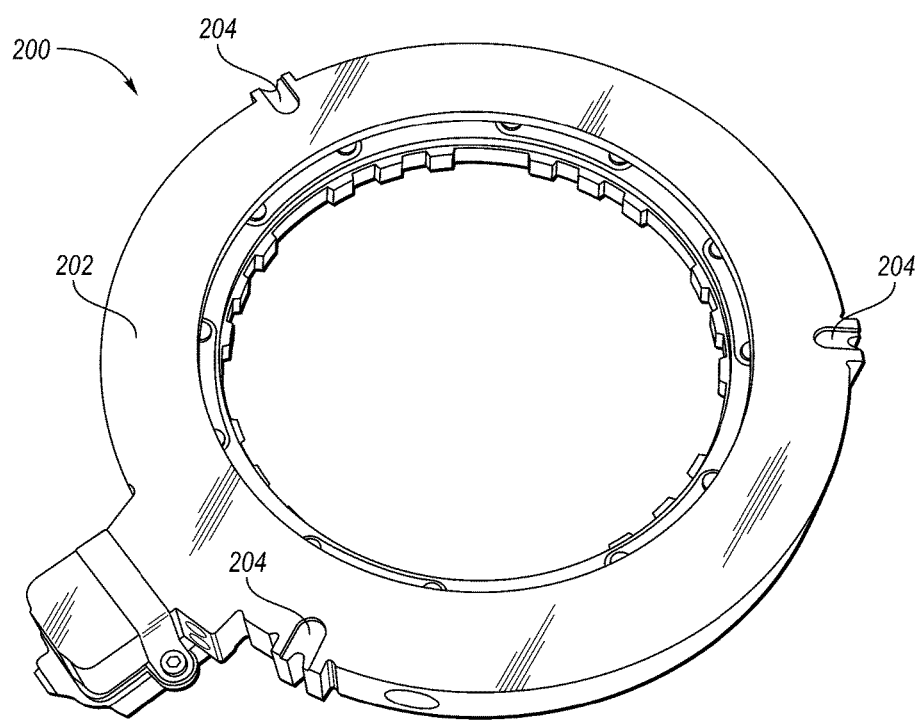
FIG. 4 is a bottom perspective view of a one-way clutch that is assembled to the clutch of FIG. 1, according to one embodiment.
Figure 5:
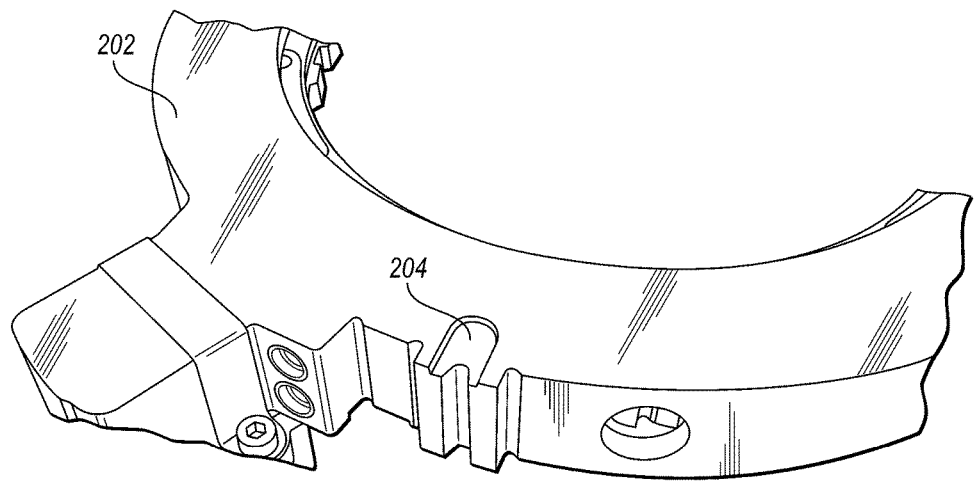
FIG. 5 is an enlarged portion of FIG. 3 illustrating a depression in the end of the one-way clutch for receiving the locating pin, according to one embodiment.

The transmission may be located adjacent to, or coupled with, a one-way clutch as part of the transaxle. One example of the one-way clutch is illustrated in FIGS. 4-5, described below. The end plate of the one-way clutch may act as a pressure plate for one of the clutches in the transmission. As part of a clutch assembly, a separator spring may be provided between one of the clutches of the transmission and the one-way clutch. The separator spring is an annular spring that biases the clutch pack while also providing resistance between the clutch and the one-way clutch. Assembly of the one-way clutch to the clutch pack sandwiches the separator spring therebetween. If the separator spring becomes dislodged or out of proper alignment, replacement or repair of the spring might require a disassembly of the clutch assembly.

According to various embodiments of this disclosure, a plurality of pins are provided radially outboard of the separator spring. The pins locate the separator spring, and also maintain proper alignment of the spring by inhibiting outwardly movement of the separator spring.

Figure 2:
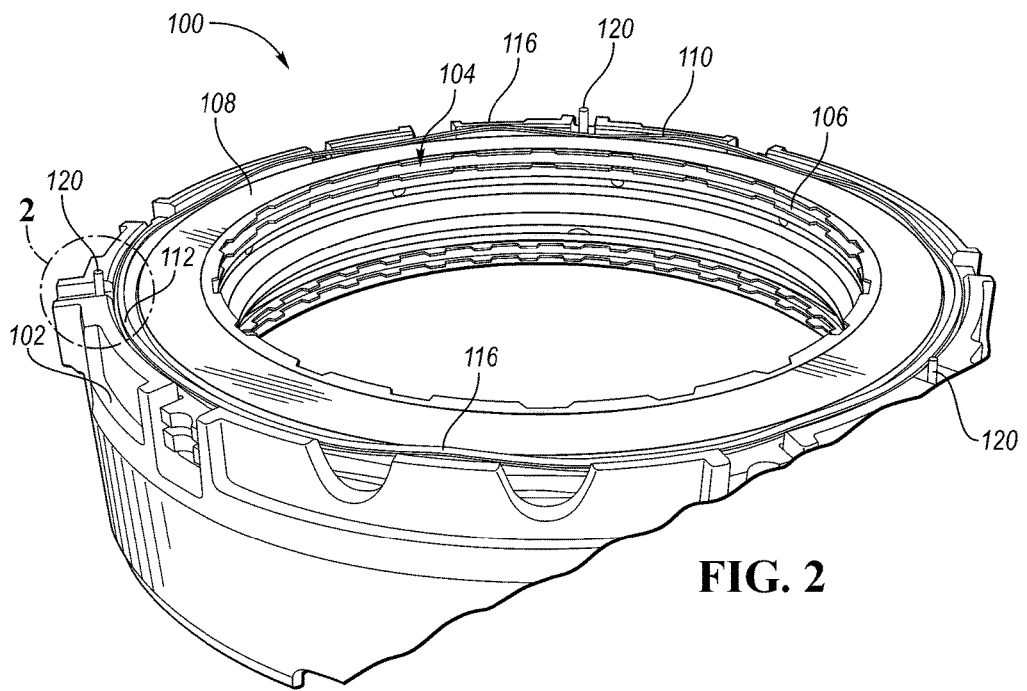
FIG. 2 is a partial top perspective view of a clutch having a clutch pack housed within a housing with a separator spring, according to one embodiment.
Figure 3:
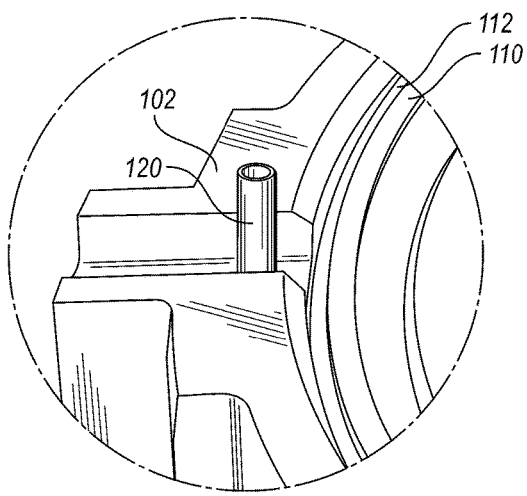
FIG. 3 is an enlarged portion of FIG. 1 illustrating a depressible locating pin for containing the separator spring, according to one embodiment.

FIG. 2 illustrates a clutch 100. The clutch 100 can be any of the clutches or brakes 60, 62, 64, 66, 68, 70 described above. The clutch 100 may also be another clutch outside of the transmission housing that connects the transmission to a one-way clutch as part of a transaxle assembly. Any and all references to the clutch 100 with the separator spring should be understood as being any of these clutches or an additional clutch not shown in FIG. 1. In one embodiment, the clutch 100 is a clutch that couples to a one-way clutch (FIGS. 4-5) as part of the transaxle to deliver torque to the differential, in which the one-way clutch acts as the pressure plate for the clutch 100.

The clutch 100 includes an outer housing 102. The housing 102 contains a clutch pack 104 having a plurality of clutch plates 106 that are selectively compressible to engage and disengage the clutch 100. Once such clutch plate is a friction plate 108 at an end of the clutch 100. The clutch plates are annular about a common central axis.

A separator spring 110 is also provided. The separator spring 110 is also annular in shape, and shares a central axis that is common to that of the clutch plates. An annular groove 112 may be provided in the housing 102 to fit the annular separator spring 110. Alternatively, the end of the housing 102 may be a flat surface. The separator spring 110 is biased to cause the free height of the clutch pack 104 to be larger than the housing that holds the clutch pack 104.

The separator spring 110 acts to open up the clutch pack 104 in its free state, causing the top friction plate 108 and separator spring 110 to rise above the end surface of the housing 102. This is shown in FIG. 1 in which waves or undulations 116 are seen in the separator spring 110.

A plurality of pins 120 are located about the outer diameter of the separator spring 110, radially outward from the separator spring 110 with respect to the central axis. The pins 120 help an individual locate the separator spring 110 into proper alignment during assembly. The pins 120 also retain the separator spring 110 in its proper alignment, inhibiting the separator spring 110 from shifting or moving radially outward, which would otherwise require repair.

In an embodiment, each pin 120 is a cylindrical member. The pins 120 can also be hollow for reduction of weight. The housing 102 may include a plurality of pockets or apertures defined therein that are each sized and positioned to receive one of the pins 120. Contained within each pocket may be a spring to bias the pin 120 outward from the pocket, e.g., in the direction of the one-way clutch or pressure plate. In this fashion, the pins 120 are each depressible within their respective pocket in the housing.

The embodiment of FIG. 2 shows three pins 120 arranged equidistant from one another about the separator spring 110. Utilizing exactly three pins 120 is, in certain embodiments, beneficial for properly inhibiting radial movement of the separator spring 110 without an unnecessarily numerous number of pins. In other embodiments, more or less than three pins 120 are utilized.

The clutch 100 may be assembled to a one-way clutch 200, shown in FIGS. 4-5. Assembly to the one-way clutch 200 can cause the pins 120 to depress into their respective pockets in the housing 102 while maintaining an adjacent location relative to the separator spring 110. The pins 120 continue to restrain radial movement of the separator spring 110 during assembly.

The one-way clutch 200 is shown in FIGS. 4-5 to have an end plate 202 that faces the friction plate 108 when assembled. The end plate 202 may be provided with a plurality of pockets or depressions 204 formed therein. The depressions 204 are aligned with the pins 120 when the one-way clutch 200 is properly aligned and positioned with respect to the clutch 100. The depressions are indents into the end plate 202 to provide a contact region for the pins 120. When the clutch 100 and the one-way clutch 200 are assembled, the pins 120 can therefore extend into both the housing 102 and the end plate 202. This assures the pins 120 can continue to restrain radial movement of the separator spring 110 regardless of the gap between the end plate 102 and the friction plate 108 during operation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch for an automotive transmission, comprising:
   a tubular housing surrounding a clutch pack and having an end for engaging with a pressure plate;
   an annular separator spring on the end for providing a biasing force against the pressure plate; and
   a plurality of depressible pins disposed in the housing and located radially outward from the spring for inhibiting radial movement of the separator spring, wherein the pins are spring biased toward the pressure plate.

2. The clutch of claim 1, wherein the housing defines a plurality of pockets, each pocket receiving one of the pins.

3. The clutch of claim 2, wherein the pins are biased toward the pressure plate.

4. The clutch of claim 1, wherein the pins are biased to extend beyond the end of the housing.

5. The clutch of claim 1, wherein the separator spring is annular in shape.

6. The clutch of claim 1, wherein the pins are located adjacent to the separator spring.

7. The clutch of claim 1, wherein the plurality of depressible pins includes exactly three pins.

8. A clutch assembly comprising:
   a clutch pack stacked along an axis;
   a housing radially surrounding the clutch pack;
   a one-way clutch axially aligned with the housing and having an end plate engaging the clutch pack;
   a separator spring disposed radially inward from the housing, and between the clutch pack and the one-way clutch; and
   a pin between the housing and the one-way clutch for inhibiting radial movement of the separator spring, wherein the pin extends into both the housing and the end plate.

9. The clutch assembly of claim 8, wherein the pin is biased toward the end plate.

10. The clutch assembly of claim 8, wherein the end plate defines a depression for receiving the pin.

11. The clutch assembly of claim 8, further comprising two or more additional pins, wherein the pin and the additional pins are arranged annularly about the separator spring.

12. The clutch assembly of claim 8, wherein the housing defines a pocket sized to receive the pin.

13. The clutch assembly of claim 12, further comprising a spring in the pocket to bias the pin toward the end plate.

14. A method of assembling a clutch assembly for an automotive transmission, comprising:
   placing an annular separator ring within a housing that contains friction plates and radially inward from a plurality of pins; and
   placing an end plate of a one-way clutch onto the housing to contain the separator spring between the housing and the end plate while compressing the pins into the housing.

15. The method of claim 14, further comprising, before placing the end plate onto the housing, placing the plurality of pins within pockets of the housing located radially outward from the separator ring.

16. The method of claim 14, wherein the plurality of pins extend into both the housing and the end plate when the end plate is placed onto the housing.

17. The method of claim 14, wherein the plurality of pins are located adjacent to the separator ring to inhibit radial movement of the separator spring.

\* \* \* \* \*